(12) United States Patent
Motoshige

(10) Patent No.: US 10,910,750 B2
(45) Date of Patent: Feb. 2, 2021

(54) CONNECTOR DEVICE WITH GUIDE SURFACE

(71) Applicant: Yazaki Corporation, Tokyo (JP)

(72) Inventor: Yuichi Motoshige, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/676,648

(22) Filed: Nov. 7, 2019

(65) Prior Publication Data

US 2020/0076104 A1 Mar. 5, 2020

Related U.S. Application Data

(63) Continuation of application No. PCT/JP2018/004251, filed on Feb. 7, 2018.

(30) Foreign Application Priority Data

Jun. 9, 2017 (JP) ................................. 2017-114124

(51) Int. Cl.
*H01R 13/02* (2006.01)
*H01R 13/04* (2006.01)
(Continued)

(52) U.S. Cl.
CPC ......... *H01R 13/04* (2013.01); *H01R 12/7005* (2013.01); *H01R 13/187* (2013.01); *H01R 13/66* (2013.01)

(58) Field of Classification Search
CPC .... H01R 12/7005; H01R 13/04; H01R 13/66; H01R 13/187
(Continued)

(56) References Cited

U.S. PATENT DOCUMENTS 2,057,344 A * 10/1936 Polimeni ................ H01R 13/04
439/453
4,352,964 A * 10/1982 English ................ H01H 23/006
200/16 D
(Continued)

FOREIGN PATENT DOCUMENTS

JP 10-199637 A 7/1998
JP 2000-322983 A 11/2000
(Continued)

OTHER PUBLICATIONS

Notice of Reasons for Refusal dated Jul. 30, 2019 from the Japanese Patent Office in application No. 2014-114124.
(Continued)

*Primary Examiner* — Abdullah A Riyami
*Assistant Examiner* — Vladimir Imas
(74) *Attorney, Agent, or Firm* — Sughrue Mion, PLLC

(57) ABSTRACT

A connector device includes a pair of first terminals, a second terminal, and a cover body. The first terminals are arranged in parallel. The second terminal includes a pair of contact points that are electrically connected to the respective first terminals, and is biased by a spring so that the contact points collectively sandwich the first terminals. The cover body made of a resin is attached to tip parts of the first terminals. The cover body includes first guide surfaces that have the contact points of the second terminal sliding thereon and guide the contact points in a direction for separating the contact points when the first terminals are connected to the second terminal. Thus, wear of the first terminals and the second terminal can be reduced.

5 Claims, 3 Drawing Sheets

(51) Int. Cl.
  *H01R 12/70* (2011.01)
  *H01R 13/187* (2006.01)
  *H01R 13/66* (2006.01)

(58) Field of Classification Search
  USPC .......................................................... 439/884
  See application file for complete search history.

(56) References Cited

U.S. PATENT DOCUMENTS

| | | | | |
|---|---|---|---|---|
| 4,534,610 | A * | 8/1985 | Takihara | H01R 13/187 |
| | | | | 439/712 |
| 4,541,034 | A * | 9/1985 | Fanning | H05K 3/308 |
| | | | | 174/255 |
| 4,546,265 | A * | 10/1985 | Tanaka | B60Q 1/387 |
| | | | | 200/61.27 |
| 4,775,338 | A * | 10/1988 | Norden | H01H 85/202 |
| | | | | 439/831 |
| 5,011,440 | A * | 4/1991 | Lee | H01R 4/4818 |
| | | | | 439/654 |
| 5,421,738 | A * | 6/1995 | Roberts | H01R 12/721 |
| | | | | 439/260 |
| 5,468,164 | A * | 11/1995 | Demissy | H01H 1/385 |
| | | | | 439/821 |
| 5,973,418 | A * | 10/1999 | Ciesielka | H01H 31/122 |
| | | | | 307/112 |
| 6,366,449 | B1 | 4/2002 | Hashizawa et al. | |
| 6,746,275 | B2 * | 6/2004 | Yamakawa | H01R 13/701 |
| | | | | 439/507 |
| 7,837,519 | B2 * | 11/2010 | Copper | H01R 13/187 |
| | | | | 439/839 |
| 7,942,683 | B2 * | 5/2011 | Copper | H01R 13/187 |
| | | | | 439/187 |
| 8,113,887 | B2 * | 2/2012 | Osawa | H01R 13/20 |
| | | | | 439/637 |
| 9,509,096 | B2 * | 11/2016 | Zhao | H01R 13/713 |
| 9,716,332 | B1 * | 7/2017 | Wimmer | H01R 13/03 |
| 9,748,688 | B2 * | 8/2017 | Hagmann | H01R 13/187 |
| 10,186,808 | B2 * | 1/2019 | Akiba | H01H 33/045 |
| 10,299,395 | B2 * | 5/2019 | Rhodes | H05K 5/0217 |
| 10,522,928 | B1 * | 12/2019 | Tang | H01R 13/187 |
| 2002/0096419 | A1 | 7/2002 | Konda | |

FOREIGN PATENT DOCUMENTS

| | | |
|---|---|---|
| JP | 2002-216593 A | 8/2002 |
| JP | 2016-6755 A | 1/2016 |

OTHER PUBLICATIONS

Notice of Reasons for Refusal dated Jul. 30, 2019 from the Japanese Patent Office in Application No. 2017-114124.

* cited by examiner

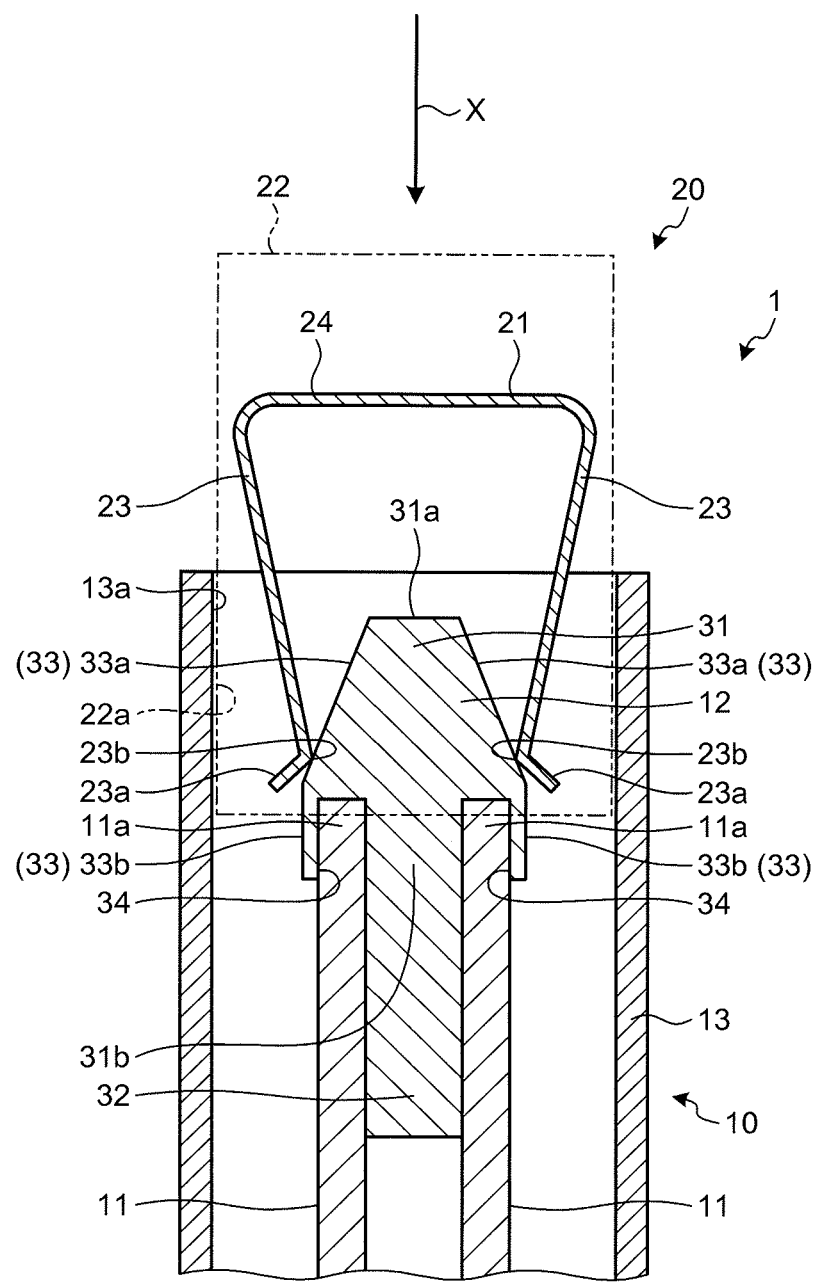

US 10,910,750 B2

CONNECTOR DEVICE WITH GUIDE SURFACE

CROSS-REFERENCE TO RELATED APPLICATION

This application is a continuation application of International Application No. PCT/JP2018/004251 filed on Feb. 7, 2018 which claims the benefit of priority from Japanese Patent Application No. 2017-114124 filed on Jun. 9, 2017 and designating the U.S., the entire contents of which are incorporated herein by reference.

BACKGROUND OF THE INVENTION

1. Field of the Invention

The present invention relates to a connector device that includes a second terminal sandwiching a pair of first terminals and being connected to the first terminals.

2. Description of the Related Art

Conventionally, there has been known a service plug (power source circuit breaking device) that is mounted on vehicles including mainly an electric vehicle and a hybrid vehicle, is incorporated in a power source circuit for supplying power from a power source unit such as a battery to a load unit such as a rotating electrical machine, and can connect or block this power source circuit as required (for example, see Japanese Patent Application Laid-open No. 2016-006755). A connector device provided to this kind of service plug includes a pair of first terminals (male terminals), and a second terminal (female terminal) that collectively sandwiches the first terminals and is electrically connected to the first terminals. By electrically connecting the first terminals with the second terminal, the first terminals are short-circuited. Thus, a power source circuit becomes energizeable and power can be supplied to a load unit.

In order to prevent a pair of first terminals and a second terminal from colliding with (hitting) each other when the first terminals are connected to the second terminal, the connector device described above has the configuration where, for example, a pick-up guide surface for guiding the second terminal is formed on a tip part of the first terminals and the second terminal slides on the guide surface.

However, in the conventional configuration, the second terminal slides on the guide surface of the first terminals every time, the connector device is attached and detached. Thus, there has been the problem that wear of the first terminals and the second terminal is likely to be generated. These first terminals and the second terminal usually have, on base materials made of metal, plating with metal having higher electric conductivity than the base materials have. Thus, there has been concerned that, when the terminals are worn, plating peels to make the base materials exposed, so that contact resistance increases.

SUMMARY OF THE INVENTION

In view of the foregoing, an object of the present invention is to provide a connector device that achieves reduction in wear of the first terminals and the second terminal.

In order to solve the above mentioned problem and achieve the object, a connector device according to one aspect of the present invention includes a pair of first terminals that are arranged in parallel; a second terminal that includes a pair of contact points electrically connected to the respective first terminals and is biased by a spring so that the contact points collectively sandwich the first terminals; and a cover body made of a resin that is attached to tip parts of the first terminals, wherein the cover body includes a guide surface on which the contact points of the second terminal slides and the guide surface guides the contact points in a direction for separating the contact points when the first terminals are connected to the second terminal, the cover body overlaps the first terminals in a connection direction of the first terminals and the second terminal to be attached to the first terminals, and the overlapped portion of the cover body is located outside than a distance between outer surfaces of the first terminals.

With this configuration, when the first terminals are connected to the second terminal, the contact points of the second terminal slide on a guide surface of the cover body made of a resin, thereby reducing the slide distance between the contact points and the first terminals and reducing wear of the first terminals and the second terminal. Thus, even when the second terminal has, for example, on a base material made of metal, plating with metal having higher electric conductivity than the base material has, wear of the second terminal is reduced, so as to prevent contact resistance along with plating peeling from increasing. In addition, the guide surface guides the contact points of the second terminal in a direction for separating the contact points of the second terminal, so as to prevent the first terminals and the second terminal from colliding with each other when the first terminals are connected to the second terminal.

In this configuration, the cover body may overlap the first terminals in a connection direction of the first terminals and the second terminal to be attached to the first terminals. With this configuration, the cover body covers the tip parts of the first terminals, thereby shortening the slide distance between the contact points of the second terminal and the first terminals and reducing wear of the first terminals and the second terminal.

In addition, the cover body may include an insulating member that is interposed between the first terminals, and the insulating member may be formed integrally with the cover body. With this configuration, attaching the cover body enables both insulation between the first terminals and reduction in wear of the second terminal, thereby simplifying the device configuration.

In addition, the second terminal may include a pair of arms that each have the contact points provided on tip sides and a connecting part that connects base end sides of the arms to each other, and the arms may be formed so as to shorten a mutual distance from the base end sides toward the tip sides. With this configuration, the spring force of the arms enables the second terminal to easily sandwich the first terminals.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a cross-sectional view of the connector device illustrating a state where the second terminal slides on a cover body.

DETAILED DESCRIPTION OF THE PREFERRED EMBODIMENTS

An embodiment according to the present invention will now be described in detail with reference to the accompanying drawings. It should be noted that this embodiment is not intended to limit this invention. Components in the embodiment include components that can be replaced and are facilitated by the skilled person or substantially like components.

Figure 1:
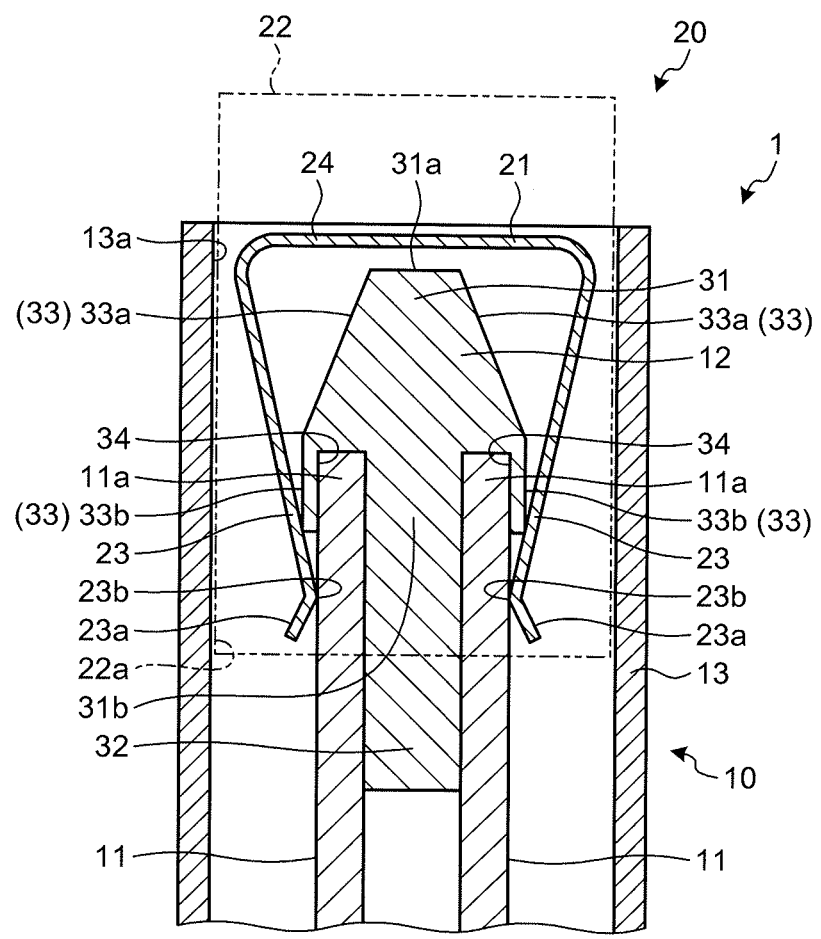
FIG. 1 is a cross-sectional view of a connector device according to the present embodiment.
Figure 2:
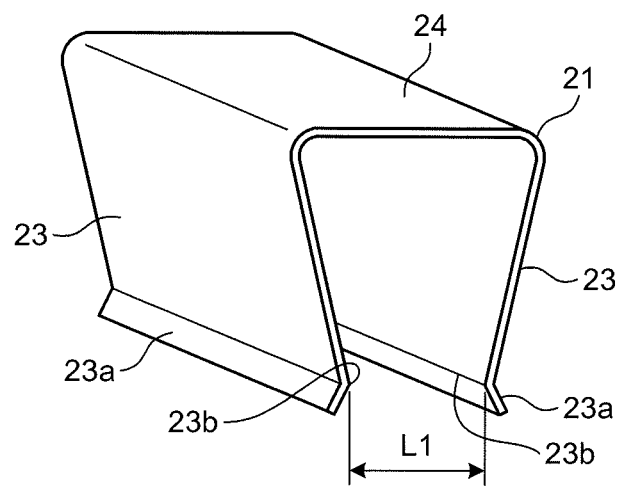
FIG. 2 is an exploded perspective view illustrating first terminals and a second terminal included in the connector device.
Figure 2:
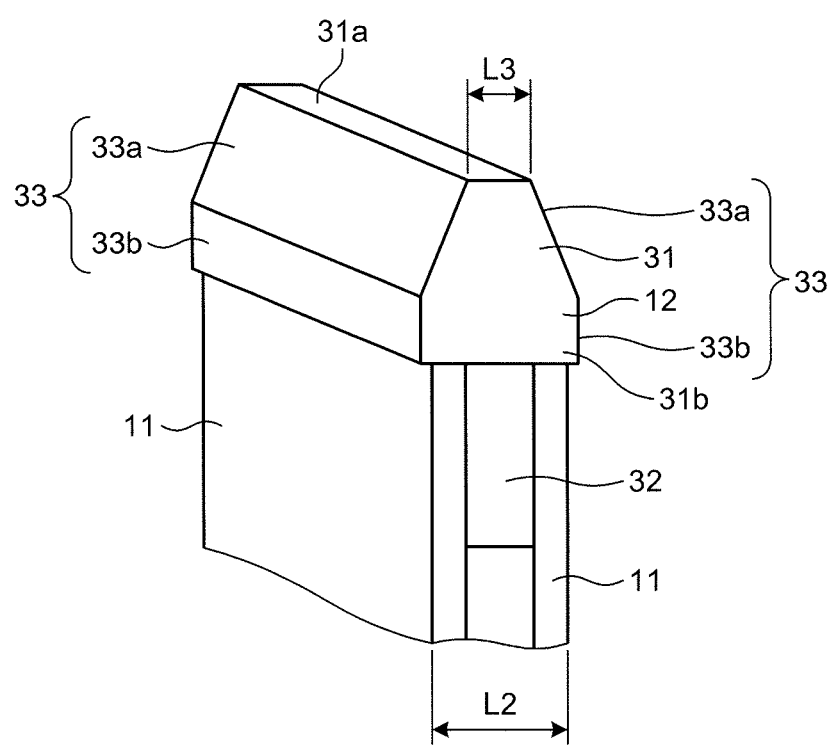

FIG. 1 is a cross-sectional view of a connector device according to the present embodiment. FIG. 2 is an exploded perspective view illustrating first terminals and a second terminal included in the connector device. The connector device according to the present embodiment is provided to, for example, a connecting part of a service plug that is mounted on vehicles including an electric vehicle and a hybrid vehicle. This kind of service plug is incorporated in a power source circuit for supplying power from a power source unit such as a battery to a load unit such as a rotating electrical machine, and is a device that causes this power source circuit to be connected (energized) or blocked as required. For example, at the time of operations such as inspection of maintenance, by releasing connection of a connector device of a service plug, a power source circuit is blocked and is made to be in a non-energized state, so as to secure the safety of an operator such as prevention of electric shock.

As illustrated in FIG. 1, a connector device 1 includes a first connector unit 10 and a second connector unit 20. The first connector unit 10 is connected to, for example, a power source unit such as a battery mounted on vehicles, and connecting the second connector unit 20 to the first connector unit 10 causes a power source circuit of a service plug to be connected (energized).

The first connector unit 10 includes a pair of first terminals (which are also referred to as male terminals) 11 and 11 that are arranged in parallel, a cover body 12 that is attached to tip parts 11a and 11a of the first terminals 11 and 11, and a first casing 13 that houses these first terminals 11 and 11 and the cover body 12. The first casing 13 includes an aperture 13a on the side of the tip parts 11a of the first terminals 11, and the second connector unit 20 enters the first casing 13 through the aperture 13a, so as to connect the first connector unit 10 and the second connector unit 20 to each other.

The first terminals 11 and 11 are each formed as flat terminals made of metal and are oppositely arranged at a prescribed interval so that plate surfaces of the first terminals 11 and 11 are set substantially in parallel. The first terminals 11 have, on base materials made of metal (for example, copper or a cooper alloy), plating with metal having higher electric conductivity (for example, nickel, tin, or silver) than the base materials applied. The first terminals 11 and 11 have electric wires each extending from a positive electrode and a negative electrode of a power source unit connected thereto, and a predetermined potential difference is made to be generated between the first terminals 11 and 11.

The second connector unit 20 includes a second terminal (which is also referred to as a female terminal and a spring terminal) 21 that is biased by a spring in order to collectively sandwich the first terminals 11 and 11 described above, and a second casing 22 that houses this second terminal 21. The second casing 22 is formed to have a size in which it can be inserted into the first casing 13, and has an aperture 22a formed on a surface opposite to the aperture 13a of the first casing 13.

The second terminal 21 is formed by bending a metal plate in substantially a U-shape. As illustrated in FIGS. 1 and 2, the second terminal 21 includes a pair of arms 23 and 23, and a connecting part 24 that connects base end sides of the arms 23 and 23. The second terminal 21 has, on a base material made of metal (for example, copper or a cooper alloy), plating with metal having higher electric conductivity (for example, nickel, tin, or silver) than this base material has.

A separation distance (mutual distance) of the arms 23 is the maximum at the base end sides connected to the connecting part 24, and is tapered as it goes toward the tip sides. On the tip sides of the arms 23, guide units 23a that are each bent toward a direction (outside) for increasing the separation distance are formed. On each of the bent parts of the guide units 23a, in other words, on each of the parts where the separation distance between the arms 23 is the minimum, a contact point 23b is formed. By collectively sandwiching the first terminals 11 and 11 with the arms 23 and 23, the second terminal 21 has the contact points 23b and 23b contacting the first terminals 11 and 11, respectively, and is electrically connected to the first terminals 11 and 11. In this manner, an electrical connection is made between the first terminals 11 and 11 through the second terminal 21. The first terminals 11 and 11 are thus short-circuited, and a power source circuit of a service plug is in a connection state (energized).

In the present embodiment, a separation distance L1 between the contact points 23b and 23b of the second terminal 21 in a normal state (state where the second terminal 21 is removed from the first terminals 11) is formed smaller than a distance (thickness) L2 between outer surfaces of the first terminals 11 and 11. By elastically expanding the arms 23 and 23 of the second terminal 21 and collectively sandwiching the first terminals 11 and 11 with the arms 23 and 23, the spring force of the second terminal 21 (connecting part 24) causes the arms 23 and 23 to be biased in a closing direction and the contact points 23b and 23b of the second terminal 21 press and contact the first terminals 11 and 11, respectively.

In the configuration where the first terminals 11 and 11 are connected by being collectively sandwiched by the second terminal 21, it is required to prevent the first terminals 11 and 11 and the second terminal 21 from colliding with (hitting) each other and reduce wear due to sliding with the first terminals 11 and 11 and the second terminal 21 when the connector device 1 is attached and detached. In the present embodiment, in order to meet these requirements, the cover body 12 is provided to the tip parts 11a and 11a of the first terminals 11 and 11.

The cover body 12 is excellent in insulation, and is formed of a resin material having lower rigidity than the second terminal 21 has. The cover body 12 includes a cover main body 31 that is attached to the tip parts 11a and 11a of the first terminals 11 and 11, and an insulating member 32 that is arranged between the first terminals 11 and 11, and the cover body 12 is formed integrally with the cover main body 31 and the insulating member 32. As illustrated in FIG. 2, the cover main body 31 is formed so as to cover the tip parts 11a and 11a over the whole area in a direction orthogonal to the distance L2 between the outer surfaces of the first terminals 11 and 11 on the tip parts 11a and 11a (see FIG. 1) of the first terminals 11 and 11. The cover main body 31 includes a guide surface 33 on which the contact points 23b and 23b of the second terminal 21 slide when the first terminals 11 and 11 are connected to or disconnected from the second terminal 21. This guide surface 33 extends from a tip part 31a of the cover main body 31 facing the second terminal 21 to the first terminals 11 and 11, and guides the contact points 23b and 23b of the second terminal 21 to the first terminals 11 and 11 while having the contact points 23b and 23b sliding thereon.

The cover main body 31 has a width L3 of the tip part 31a formed smaller than the separation distance L1 between the contact points 23b and 23b of the second terminal 21 described above, and can prevent the first terminals 11 and 11 and the second terminal 21 from colliding with (hitting) each other when the first terminals 11 and 11 sandwich the second terminal 21 therebetween and are connected to the second terminal 21. The guide surface 33 includes first guide surfaces 33a that tilt in a direction for expanding the separation distance between the contact points 23b and 23b from the tip part 31a of the cover main body 31 toward a base end part 31b to which the first terminals 11 and 11 are connected, and second guide surfaces 33b that continue into the first guide surfaces 33a. The first guide surfaces 33a make the separation distance between the contact points 23b and 23b wider than at least the distance (thickness) L2 between the outer surfaces of the first terminals 11 and 11. The second guide surfaces 33b connect the first guide surfaces 33a with the first terminals 11 and 11, and a pair of the second guide surfaces 33b and 33b are formed substantially in parallel.

With this configuration, the contact points 23b of the second terminal 21 slide on the first guide surfaces 33a and the second guide surfaces 33b of the cover main body 31, so as to be guided to the first terminals 11. In this manner, the slide distance between the contact points 23b of the second terminal 21 and the first terminals 11 can be reduced, and wear of the contact points 23b of the second terminal 21 and the first terminals 11 can be reduced. Thus, this configuration can reduce plating peeling of the contact points 23b of the second terminal 21 and the first terminals 11, and can prevent contact resistance along with this plating peeling from increasing. In addition, reducing plating peeling of the contact points 23b of the second terminal 21 and the first terminals 11 can reduce the thickness of plating applied to the second terminal 21 and the first terminals 11.

The cover main body 31 includes grooves 34 and 34 in which the tip parts 11a and 11a of the first terminals 11 and 11 are inserted, respectively. By inserting the tip parts 11a of the first terminals 11 into the grooves 34, the cover main body 31 can overlap the first terminals 11 and 11 in a connection direction of the first terminals 11 and the second terminal 21. With this configuration, the cover main body 31 covers the tip parts 11a of the first terminals 11, so as to shorten the slide distance between the contact points 23b of the second terminal 21 and the first terminals 11 and reduce wear of the first terminals 11 and the second terminal 21. In addition, an overlap between the cover main body 31 and the first terminals 11 and 11 can prevent a gap between the cover main body 31 and the first terminals 11 and 11 from being generated. Thus, this configuration can securely connect the first terminals 11 with the second terminal 21 and can reduce continuity failure between the first terminals 11 and the second terminal 21.

By contrast, the insulating member 32 is interposed between the first terminals 11 and 11, and functions as a spacer for holding the first terminals 11 and 11 at a prescribed interval while preventing the first terminals 11 and 11 from directly contacting each other. In FIG. 1, the insulating member 32 is provided to the middle of a height direction of the first terminals 11, but of course, the insulating member 32 may be provided to the lower end of the first terminals 11. In the present embodiment, the cover body 12 forms the insulating member 32 integrally with the cover main body 31, and attaching the cover body 12 to the first terminals 11 and 11 can achieve both support insulation between the first terminals 11 and 11 and reduction in wear of the first terminals 11 and 11 and the second terminal 21. Thus, simplification of the device configuration can be achieved.

The following describes a connection operation of the first terminals 11 and the second terminal 21. FIG. 3 is a cross-sectional view of the connector device illustrating a state where the second terminal slides on the cover body. First, when the second casing 22 of the second connector unit 20 is inserted in a connection direction (X direction in FIG. 3) through the aperture 13a of the first casing 13, the cover body 12 attached to the tip parts 11a and 11a of the first terminals 11 and 11 enters the second casing 22 through the aperture 22a of the second casing 22.

Because the width L3 of the tip part 31a of the cover main body 31 in the cover body 12 is smaller than the separation distance L1 between the facing contact points 23b and 23b of the second terminal 21 (FIG. 2), the tip part 31a enters a space between the contact points 23b and 23b without colliding with the second terminal 21.

When insertion of the second connector unit 20 is advanced, the contact points 23b and 23b of the second terminal 21 contact the first guide surfaces 33a of the cover main body 31. The first guide surfaces 33a tilt so as to be wider from the tip part 31a toward the base end part 31b of the cover main body 31. Thus, sliding of the contact points 23b and 23b on the first guide surfaces 33a and 33a causes the arms 23 and the connecting part 24 of the second terminal 21 to be elastically deformed and the separation distance between the contact points 23b and 23b to extend. After that, the contact points 23b and 23b of the second terminal 21 are guided from the first guide surfaces 33a and 33a to the first terminals 11 and 11 through the second guide surfaces 33b and 33b. At this time, as illustrated in FIG. 1, by recovering elastic deformation of the arms 23 and the connecting part 24 of the second terminal 21, the contact points 23b and 23b of the second terminal 21 sandwich the first terminals 11 and 11 with a biasing force of a spring. In this manner, the first terminals 11 and 11 and the second terminal 21 are electrically connected to each other, and connection between the first connector unit 10 and the second connector unit 20 is completed. When the connection is released, the second connector unit 20 is drawn out in a direction opposite to an insertion direction, so as to release the connection between the first terminals 11 and 11 and the second terminal 21.

As described above, the connector device 1 according to the present embodiment includes a pair of the first terminals 11, the second terminal 21, and the cover body 12. The first terminals 11 are arranged in parallel. The second terminal 21 includes a pair of the contact points 23b that are electrically connected to the respective first terminals 11, and is biased by a spring so that the contact points 23b collectively sandwich the first terminals 11. The cover body 12 made of a resin is attached to the tip parts 11a of the first terminals 11. The cover body 12 includes the first guide surfaces 33a that have the contact points 23b of the second terminal 21 sliding thereon and guide the contact points 23b in a direction for separating the contact points 23b and 23b when the first terminals 11 are connected to the second terminal 21. With this configuration, when the first terminals 11 are connected to the second terminal 21, the contact points 23b of the second terminal 21 slide on the first guide surfaces 33a of the cover body 12, thereby reducing the slide distance between the contact points 23b and the first terminals 11 and reducing wear of the first terminals 11 and the second terminal 21. Even when the second terminal 21 has plating applied to a base material made of metal, wear of the first terminals 11 and the second terminal 21 is reduced so as to prevent contact resistance along with plating peeling from increasing. In addition, the first guide surfaces 33a guide the contact points 23b in a direction for separating the contact points 23b and 23b, so as to prevent the first terminals 11 and the second terminal 21 from colliding with each other when the first terminals 11 are connected to the second terminal 21. Furthermore, the cover body 12 is attached to the first terminals 11, and the cover body 12 can be appropriately replaced when wear and deformation are generated on the first guide surfaces 33a of the cover body 12 by sliding with the second terminal 21. Thus, the first terminals 11 and the second terminal 21 can be effectively reduced.

According to the present embodiment, the cover body 12 overlaps the first terminals 11 in a connection direction of the first terminals 11 and the second terminal 21 to be attached to the first terminals 11. Thus, the cover body 12 covers the tip parts 11a of the first terminals 11, so as to shorten the slide distance between the contact points 23b of the second terminal 21 and the first terminals 11 and reduce wear of the first terminals 11 and the second terminal 21.

According to the present embodiment, the cover body 12 includes the insulating member 32 that is interposed between the first terminals 11. Because this insulating member 32 forms the cover body 12 integrally with the cover main body 31, attaching the cover body 12 to the tip parts 11a of the first terminals 11 and 11 can achieve both insulation between the first terminals 11 and 11 and reduction in wear of the first terminals 11 and the second terminal 21. Thus, simplification of the device configuration of the connector device 1 can be achieved.

According to the present embodiment, the second terminal 21 includes a pair of the arms 23 that each have the contact points 23b provided on the tip sides, and the connecting part 24 that connects the base end sides of the arms 23. The arms 23 are formed so as to shorten a mutual distance from the base end sides toward the tip sides, thereby enabling, with the spring force thereof, the second terminal 21 to easily sandwich the first terminals 11.

As above, one embodiment of the present invention has been described, but the present embodiment has been presented by way of example only and is not intended to limit the scope of the invention. The present embodiment may be implemented in a variety of other forms, and various omissions, substitutions, and changes may be made without departing from the spirit of the invention. The accompanying claims and their equivalents are intended to cover the present embodiment and the modification as would fall within the scope and spirit of the invention. For example, in the embodiment described above, the cover body 12 has the configuration where the cover main body 31 and the insulating member 32 are integrally formed, but the insulating member 32 may be formed as a separate body.

In the present embodiment, the cover main body 31 is formed so as to cover the tip parts 11a and 11a over the whole area in a direction orthogonal to the distance L2 between the outer surfaces of the first terminals 11 and 11 on the tip parts 11a and 11a of the first terminals 11 and 11, but this is not limiting. Specifically, a pair of cover main bodies may be provided on a part in a direction orthogonal to the distance L2 between the outer surfaces of the first terminals 11 and 11, for example, on both side parts of the first terminals 11 in the orthogonal direction. A single cover main body may be provided on a center part of the first terminals 11 in the orthogonal direction.

In the present embodiment, the second terminal 21 has been described as the one having substantially a U-shaped cross section that includes a pair of the arms 23 and 23, and the connecting part 24 that connects the base end sides of the arms 23 and 23. However, the shape of the second terminal 21 is not limited to this if the second terminal 21 collectively sandwiches the first terminals 11 and 11 by spring-biasing.

In the present embodiment, the first terminals 11 and the second terminal 21 have plating on the surfaces of base materials, but this is not limiting. The first terminals 11 and the second terminal 21 may be formed of a metal plate having higher electric conductivity (which is made of, for example, aluminum or an aluminum alloy). In this case, plating is not necessary for the surfaces of base materials.

In the present embodiment, the connector device 1 is used for a connecting part of a service plug, but of course, the present embodiment may be applied to a connector device used for other purposes.

According to the present embodiment, when a pair of first terminals are connected to a second terminal, a pair of contact points of the second terminal slide on a guide surface of a cover body made of a resin, thereby reducing the slide distance between the contact points and the first terminals and reducing wear of the first terminals and the second terminal.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector device comprising:
   a pair of first terminals that are arranged in parallel;
   a second terminal that includes a pair of contact points electrically connected to the respective first terminals and is biased by a spring so that the contact points collectively sandwich the first terminals; and
   a cover body made of a resin that is attached to tip parts of the first terminals, wherein
   the cover body includes a guide surface sliding the contact points of the second terminal and guiding the contact points in a direction for separating the contact points when the first terminals are connected to the second terminal,
   the cover body includes grooves into which the tip parts of the pair of first terminals are inserted respectively, overlaps the first terminals and the cover body in a connection direction of the first terminals and the second terminal to be attached to the first terminals by inserting the tips of the pair of the first terminals into each grooves, and
   the overlapped portion of the cover body is located outside than a distance between outer surfaces of the first terminals in an entire width direction perpendicular to the connection direction and an opposite direction of the pair of first terminals.

2. The connector device according to claim 1, wherein the cover body includes an insulating member that is interposed between the first terminals, and the insulating member is formed integrally with the cover body.

3. The connector device according to claim 1, wherein the second terminal includes a pair of arms that each have the contact points provided on tip sides thereof and a connecting part that connects base end sides of the arms to each other, and the arms are formed so as to shorten a mutual distance from the base end sides toward the tip sides.

4. The connector device according to claim 2, wherein the second terminal includes a pair of arms that each have the contact points provided on tip sides and a connecting part that connects base end sides of the arms to each other, and the arms are formed so as to shorten a mutual distance from the base end sides toward the tip sides.

5. The connector device according to claim 2, wherein the insulating member is formed at a constant thickness from a base end part at the cover body side to a tip end part opposite to the cover body side, and the insulating member holds a prescribed interval between the pair of first terminals so that each of the outer surfaces of the pair of first terminals inserted into the grooves are parallel to each other.

* * * * *